(12) United States Patent
Jonsson et al.

(10) Patent No.: US 9,408,109 B2
(45) Date of Patent: Aug. 2, 2016

(54) CONGESTION CONTROL IN A COMMUNICATION NETWORK

(75) Inventors: Anders Jonsson, Täby (SE); Martin Skarve, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 13/880,760

(22) PCT Filed: Oct. 29, 2010

(86) PCT No.: PCT/SE2010/051183
§ 371 (c)(1),
(2), (4) Date: Apr. 22, 2013

(87) PCT Pub. No.: WO2012/057667
PCT Pub. Date: May 3, 2012

(65) Prior Publication Data
US 2013/0208585 A1    Aug. 15, 2013

(51) Int. Cl.
*H04J 1/00* (2006.01)
*H04W 28/02* (2009.01)
*H04L 12/801* (2013.01)

(52) U.S. Cl.
CPC ........... *H04W 28/0289* (2013.01); *H04L 47/12* (2013.01); *H04L 47/193* (2013.01); *H04L 47/14* (2013.01)

(58) Field of Classification Search
CPC ....................................................... H04J 1/16
USPC ............................................ 370/395.21, 472
See application file for complete search history.

(56) References Cited

U.S. PATENT DOCUMENTS

| | | | |
|---|---|---|---|
| 6,965,565 B1 | 11/2005 | Duclos | |
| 7,554,907 B1 * | 6/2009 | Epps et al. | 370/230 |
| 7,684,422 B1 | 3/2010 | Sindhu et al. | |
| 2001/0055313 A1 | 12/2001 | Yin et al. | |
| 2003/0123392 A1 | 7/2003 | Ruutu et al. | |

(Continued)

FOREIGN PATENT DOCUMENTS

| | | |
|---|---|---|
| EP | 1249972 A1 | 10/2002 |
| EP | 1876779 A2 | 1/2008 |

(Continued)

OTHER PUBLICATIONS

Alcaraz, J.J. et al. "Using Buffer Management in 3G Radio Bearers to Enhance End-to-End TCP Performance." 20th International Conference on Advanced Information Networking and Applications, Apr. 18-20, 2006, pp. 1-5, vol. 2.

(Continued)

*Primary Examiner* — Shaq Taha
(74) *Attorney, Agent, or Firm* — Murphy, Bilak & Homiller, PLLC

(57) ABSTRACT

A method for congestion control in a network node (20) of a communication network utilizing a distributed queue system for transmission of data units is disclosed. Said network node (20) has a priority queue (PQ) (40) for protocol data units (PDUs) (50, 50a-n) in accordance with a persistent retransmission protocol. The method comprises detecting (110) a condition indicative of a congestion and, in response thereto, manipulating (120) the content of a PDU (50, 50a-n) in the PQ (40). A related network node (20), computer program product, and computer readable medium are also disclosed.

21 Claims, 3 Drawing Sheets

(56) References Cited

U.S. PATENT DOCUMENTS

| | | | |
|---|---|---|---|
| 2008/0056273 A1* | 3/2008 | Pelletier et al. | 370/395.21 |
| 2008/0225728 A1* | 9/2008 | Plamondon | 370/237 |
| 2009/0175173 A1* | 7/2009 | Kim et al. | 370/241 |
| 2009/0175241 A1 | 7/2009 | Ohta et al. | |
| 2009/0215462 A1 | 8/2009 | Lundh et al. | |
| 2010/0232356 A1* | 9/2010 | Maheshwari et al. | 370/328 |
| 2013/0010598 A1 | 1/2013 | Ludwig et al. | |

FOREIGN PATENT DOCUMENTS

| | | |
|---|---|---|
| RU | 2346402 C1 | 2/2009 |
| WO | 2007011298 A1 | 1/2007 |
| WO | 2008097628 A2 | 8/2008 |
| WO | 2008133577 A1 | 11/2008 |
| WO | 2008154786 A1 | 12/2008 |

OTHER PUBLICATIONS

Allman, L. et al. "TCP Congestion Control." The Internet Society, IETF Standard, Internet Engineering Task Force, Apr. 1, 1999, pp. 1-16.

Liu, C. et al. "Improving Explicit Congestion Notification with the Mark-Front Strategy." Computer Networks, vol. 35, No. 2-3, pp. 185-201, Feb. 2001, Elesevier Science Publishers, B.V., Amsterdam, Netherlands.

Nédas, S. et al. "Providing Congestion Control in the Iub Transport Network for HSDPA." IEEE Global Telecommunications Conference, Nov. 26-30, 2007, pp. 5293-5297, Washington, DC, USA.

Ngo, B. et al. "Using Relay Balance and AQM Schemes to Improve Performance in Multi-hop Wireless Networks." IEEE Wireless Communications and Networking Conference, Mar. 11-15, 2007, pp. 879-885, Kowloon, Honk Kong.

3rd Generation Partnership Project. 3GPP TS 25.306 V6.10.0. 3rd Generation Partnership Project; Technical Specification Group Radio Access Network; UE Radio Access capabilities (Release 6). Mar. 2007, pp. 1-34.

3rd Generation Partnership Project. 3GPP TS 25.322 V6.9.0. 3rd Generation Partnership Project; Technical Specification Group Radio Access Network; Radio Link Control (RLC) protocol specification (Release 6). Sep. 2006, pp. 1-86.

3rd Generation Partnership Project. 3GPP TS 25.331 V6.3.0. 3rd Generation Partnership Project; Radio Resource Control (RRC); Protocol specification. Sep. 2004.

3rd Generation Partnership Project. "Rel-6 CR to 25.306 on Correction to memory handling in the UE." TSG-RAN Meeting #24, RP-040223, Jun. 2-4, 2004, pp. 1-4, Seoul, Korea.

3GPP, "3rd Generation Partnership Project; Technical Specification Group Radio Access Network; Medium Access Control (MAC) protocol specification (Release 6)", 3GPP TS 25.321 V6.18.0, Mar. 2009, 1-93.

* cited by examiner

CONGESTION CONTROL IN A COMMUNICATION NETWORK

TECHNICAL FIELD

The present invention relates to congestion control in a communication network, such as a radio communication network.

BACKGROUND

In WCDMA (Wideband Code-Division Multiple Access) HS-DSCH (High-Speed Downlink Shared CHannel) radio networks, the radio network controller (RNC) is responsible for ensuring that data is available in the radio base station (RBS) for transmission. To facilitate this, the RNC sends radio link control (RLC) data via a transport network (TN) to the RBS. Normally, the RNC controls the buffer fill level in the RBS by sending RLC protocol data units (PDUs) to the RBS via a TN frame protocol (FP). While the RBS sends capacity allocations (CA) as input to this traffic shaping, it is still the RNC that controls how much data and at which rate this shall be sent to the RBS.

It should be noted that since RLC is terminated in the RNC and in the user equipment (UE), any RLC data residing in an RBS queue is seen as delayed by the RLC entities involved in the data transmission. As a result of this, the RNC might poll timer expiry poll data that has been transmitted from the RNC but not yet acknowledged by the UE. Thus, for instance if the amount of data in the RBS priority queue (PQ) is large in relation to the aggregated rate over the air interface (Uu), then the RLC entity in the RNC might poll the RLC entity in the UE due to the buildup of a transmission delay even though no data has actually been lost. Consequently this can lead to unnecessary retransmissions of RLC PDUs or POLL_SUFIs (SUper FIelds) sent solely to poll the receiving RLC entity.

RLC retransmissions might also pose a potential challenge. If these are delayed by data already buffered in the PQ, this can lead to multiple requests for the same data even though the previously retransmitted data is already in transit but buffered in the RBS PQ. In this situation with delayed retransmissions, the UE may have time to send an additional RLC status report before the initial retransmission even has been transmitted to the UE over the air interface leading to a situation were multiple copies of the same data might be sent both over the TN and Uu interfaces. This results in an inefficient use of the TN and air interface resources, since the additional copies of retransmitted RLC PDUs do not contribute to the user experienced throughput since they will be discarded by the receiving RLC entity in the UE.

SUMMARY

Accordingly, there is a need for means to handle congestion in communication networks, such as radio communication networks. A general object of embodiments of the present invention is to provide for congestion control in a network node, such as radio base station (RBS), of a communication network, such as a radio communication network (e.g. a WCDMA HS-DSCH radio communication network).

According to a first aspect, there is provided a method for congestion control in a network node of a communication network utilizing a distributed queue system for transmission of data units. Said network node has a priority queue (PQ) for protocol data units (PDUs) in accordance with a persistent retransmission protocol. The method comprises detecting a condition indicative of a congestion and, in response thereto, manipulating the content of a PDU in the PQ.

The PDU subject to manipulation may e.g. be a PDU in the head of the PQ or a PDU in the PQ to be transmitted in the same transmission time interval (TTI) as the PDU in the head of the PQ.

Manipulating the content of the PDU may comprise altering one or more bits of a service data unit (SDU) payload of the PDU. For example, altering one or more bits of the SDU payload of the PDU may comprise altering the last bit (possibly only the last bit) of the PDU.

Manipulating the content of the PDU may comprise leaving a header of the persistent retransmission protocol included in the PDU intact (or "unchanged").

The condition indicative of congestion may be that a targeted buffer length or dwell time in the PQ is exceeded. Alternatively, the condition indicative of congestion may be a loss of data in a transport network (TN) between a network controller and the network node.

The communication network may be a radio communication network, such as a WCDMA HS-DSCH radio network. The network node may be a radio base station (RBS). Said PDUs in accordance with a persistent retransmission protocol may be radio link control (RLC) PDUs. Said network controller may be a radio network controller (RNC).

According to a second aspect, there is provided a computer program product comprising computer program code means for executing the method according to the first aspect when said computer program code means are run by a programmable control unit of the network node.

According to a third aspect, there is provided a computer readable medium having stored thereon a computer program product comprising computer program code means for executing the method according to the first aspect when said computer program code means are run by a programmable control unit of the network node.

According to a fourth aspect, there is provided a computer program product for congestion control in a network node of a communication network utilizing a distributed queue system for transmission of data units. The network node has a PQ for PDUs in accordance with a persistent retransmission protocol. The computer program product comprises a computer program module for detecting a condition indicative of a congestion and a computer program module for, in response to detecting the condition indicative of congestion, manipulating the content of a PDU in the PQ.

According to a fifth aspect, there is provided a network node for operation in a communication network utilizing a distributed queue system for transmission of data units. Said network node has a PQ for PDUs in accordance with a persistent retransmission protocol. The network node comprises a control unit configured to detect a condition indicative of a congestion and, in response thereto, manipulate the content of a PDU in the PQ.

The PDU subject to manipulation may be a PDU in the head of the PQ or a PDU in the PQ to be transmitted in the same transmission time interval (TTI) as the PDU in the head of the PQ.

The control unit may be adapted to manipulate the content of the PDU by altering one or more bits of an SDU payload of the PDU. For example, the control unit may be adapted to manipulate the content of the PDU by altering the last bit (possibly only the last bit) of the PDU.

The control unit may be adapted to leave a header of the persistent retransmission protocol included in the PDU intact when manipulating the content of the PDU.

One condition indicative of congestion that the control unit may be adapted to detect is that a targeted buffer length or dwell time in the PQ is exceeded. Alternatively or additionally, one condition indicative of congestion that the control unit may be adapted to detect is a loss of data in a TN between a network controller and the network node.

The communication network may be a radio communication network, such as a WCDMA HS-DSCH radio network. The network node may be an RBS. Said PDUs in accordance with a persistent retransmission protocol may be RLC PDUs. Said network controller may be an RNC.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
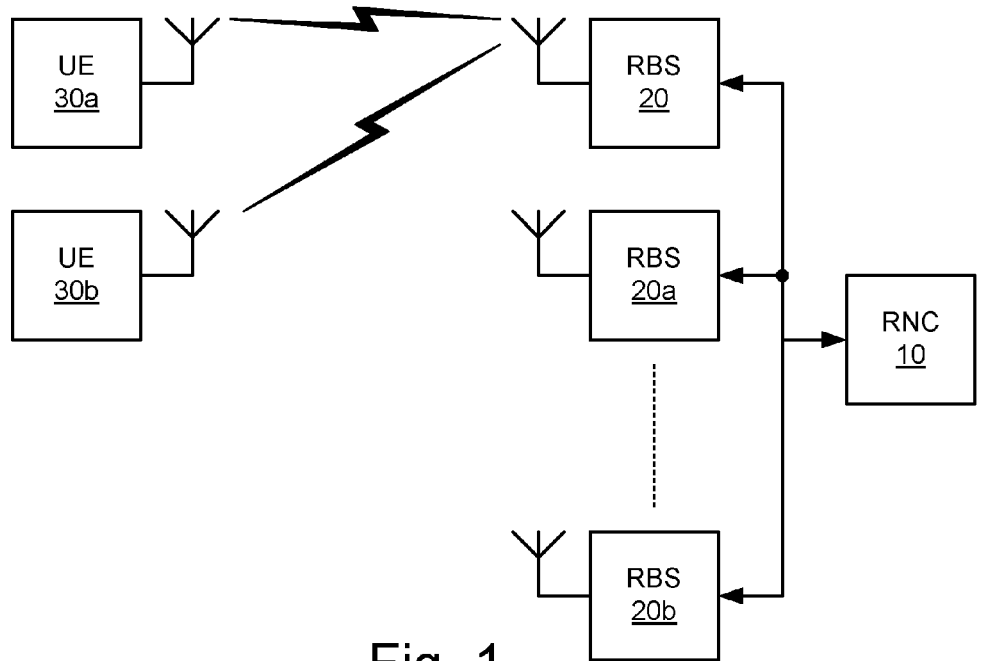
FIG. 1 schematically illustrates a radio communication network.

FIG. 1 schematically illustrates an environment where embodiments of the present invention may be employed. A radio network controller (RNC) 10 of a radio communication network, such as a wideband code-division multiple access (WCDMA) high-speed downlink shared channel (HS-DSCH) radio communication network, is operatively connected to a number of radio base stations (RBSs) 20, 20a-b that operate under the control of the RNC 10. Furthermore, a UE (User Equipment) 30a and a UE 30b are operatively connected to the RBS 20 over wireless connections for communication of data packets. For simplicity, only the UEs 30a and 30b have been included in FIG. 1. However, in reality, any viable number of UEs may be operatively connected at any time to any of the RBSs 20, 20a-b over such wireless connections. In the following, embodiments of the present invention are presented with reference to the RBS 20. However, any of the RBSs 20a-b may be configured to operate in the same way as the RBS 20.

According to embodiments of the present invention, a so called distributed queue system is employed in the downlink (DL), i.e. in the direction from the network side towards the UEs 30a-b. In such a distributed queue system, the queue of data units to be sent to the UEs 30a-b are distributed between the RNC 10 and the RBS 20, such that part of the queue resides in the RNC 10 and part of the queue resides in the RBS 20. Furthermore, according to embodiments of the present invention, a so called persistent retransmission protocol is employed, such as the radio link control (RLC) protocol normally utilized in the WCDMA HS-DSCH. A persistent retransmission protocol is a protocol that sends data, monitors response from the receiving entity and in case of missing response or indication of missing or erroneously decoded data, requests retransmission and keeps on doing this e.g. for a predefined time or number of attempts.

Embodiments of the present invention are described below in the context of a WCDMA HS-DSCH radio communication network, i.e. a radio networks in which data can be transmitted over a WCDMA HS-DSCH (and possibly over other types of channels as well). However, this is not intended as limiting. Some embodiments of the present invention are equally well applicable to other types of radio (or other) communication networks utilizing a distributed queue system for transmission of data units, where the queue is distributed between a network controller (e.g. RNC 10) and a network node (e.g. RBS 20), and a persistent retransmission protocol (of which RLC is an example). For example, GSM (Global System for Mobile Communications), GPRS (General Packet Radio Service), and EGPRS (Enhanced GPRS) networks (or combinations thereof) utilizing the RLC protocol are other examples of such communication networks where embodiments of the present invention may be employed.

In so called active queue management (AQM), packets are dropped, or discarded, before queues overflow in order to reduce congestion. The inventors have realized that a drawback with conventional AQM as applied in "normal" WCDMA flow control is that it discards a packet from the incoming queue in the RNC 10 before this is segmented into RLC PDUs (Protocol Data Units). One disadvantage realized by the inventors is that this introduces a delay, since the TCP (Transmission Control Protocol) entity in the receiving UE 30a-b will not take note of the missing TCP packet until all data residing in the RLC transmission window and the priority queue (PQ) of the RBS 20 has been sent to the receiving UE 30a-b. Another disadvantage, which has been realized by the inventors, is that this scheme also requires some form of in- or out of band signaling from RBS to RNC to indicate that the RNC should drop a TCP data packet.

Figure 2:
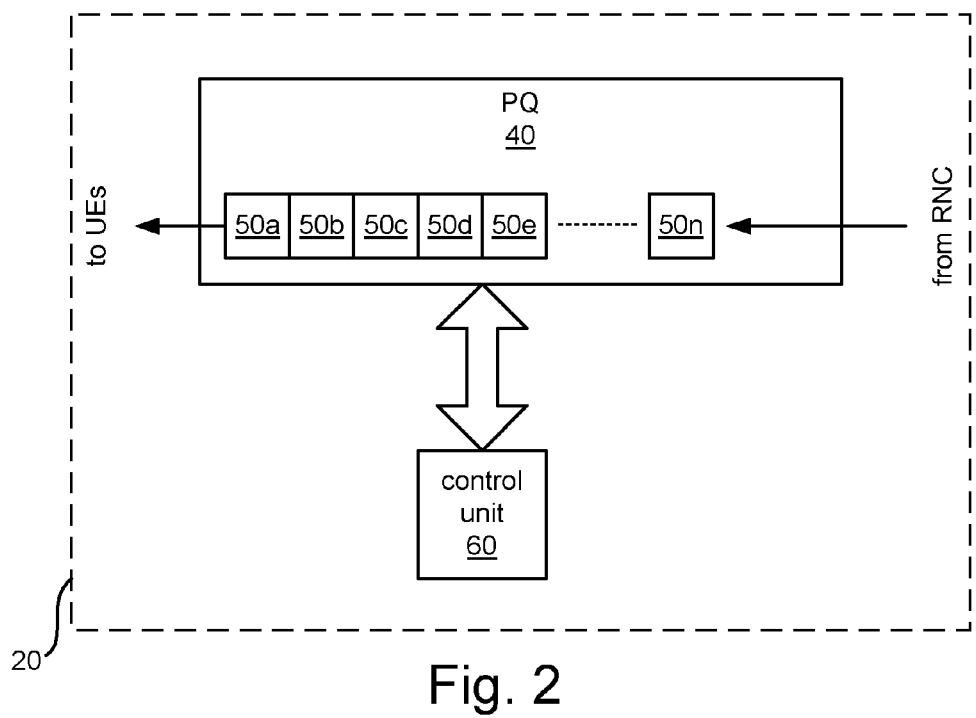
FIG. 2 schematically illustrates part of a radio base station in accordance with an embodiment of the present invention.

FIG. 2 schematically illustrates part of the RBS 20 in accordance with an embodiment of the present invention. As shown in FIG. 2, a priority queue (PQ) 40 for temporary storage of RLC PDUs 50a-n waiting for transmission to UEs 30a-b resides in the RBS 20. The number of RLC PDUs 50a-n naturally varies in time depending on data traffic etc. Furthermore, the RBS 20 comprises a control unit 60 for controlling the PQ 40. Of course, the RBS 20 comprises numerous other units as well, such as radio circuitry and digital baseband circuitry, required for its functioning. However, the design of RBSs in general is known in the art and therefore not described in further detail in this detailed description.

Figure 3:
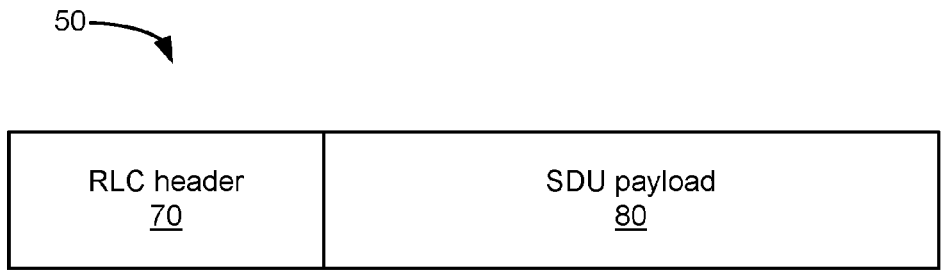
FIG. 3 schematically illustrates a protocol data unit according to an example.

FIG. 3 schematically illustrates an RLC PDU 50 (which may e.g. be any of the RLC PDUs 50a-n in FIG. 2). As shown in FIG. 3, the RLC PDU 50 comprises an RLC header 70, comprising control information of the RLC protocol, and a service data unit (SDU) payload 80 (in the following referred to as "the RLC SDU 80") received from an upper layer comprising basically the data to be transmitted using the RLC protocol. The RLC SDU 80 may itself comprise several levels of control headers from protocols utilized in upper layers.

According to embodiments of the present invention, an excessive buildup of data in the RBS 20 may be avoided by targeting a certain buffer fill level in the RBS 20. TCP packets (which are comprised in PDUs 50a-n) in the PQ 40 of the RBS 20 may be discarded when a condition indicative of congestion is detected. As is further described below in the context of specific embodiments, a TCP packet may be discarded by manipulating (or corrupting) the content of a corresponding PDU 50a-n. The discarded TCP packets will in turn result in that the TCP protocol enters a so-called congestion avoidance mode leading to a lowered rate of data being sent to the PQ 40 of the RBS 20 from the TCP server. Hence, embodiments of the present invention provides congestion control by triggering inherent congestion avoidance mechanisms of the TCP protocol.

It is advantageous to indicate congestion as early as possible to avoid buffer overruns. In accordance with some embodiments, a relatively efficient buffer fill level control may be obtained by ensuring a relatively quick response on the TCP level when the target buffer fill level in the PQ 40 of the RBS 20 is reached. This can be achieved by ensuring that the TCP entity residing in the UE 30a-b can be able to notice a missing or corrupt TCP data packet as early as possible. This can for example be achieved by purposely corrupting a data packet or packets from the head of the PQ 40 residing in the RBS 20.

The data transmitted from the RNC 10 to the RBS 20 is either carried over a frame protocol type 1 (FP type 1) in the case when the RBS 20 is configured with MAC-hs, or a FP type 2 when MAC-ehs is used. However, in both cases the user data contained in these frames are viewed as MAC-d PDUs by the RBS 20. For FP type 2 then the MAC-d PDUs are identical in size to the RLC PDUs but for FP type 1 then the MAC-d PDU may also contain C/T multiplexing data which adds an additional 4 bits to the header. For example, MAC C/T multiplexing is commonly employed on the signaling radio bearer (SRB). However, in most cases concerning user plane data carried over FP type 1, then no C/T multiplexing is employed and the MAC-d PDUs are identical in size to an RLC PDU in the same way as for FP type 2. Terms such as "MAC-hs", "MAC-ehs", "MAC-d", "FP type 1", "FP type 2", and "MAC C/T multiplexing" used above are well known to the skilled person, e.g. from the 3GPP TS25.321 specification, and are therefore not described herein in any further detail.

According to embodiments of the present invention, there is provided a method for congestion control in the RBS 20. The method may e.g. be performed by the control unit 60. The terminology "congestion control in the RBS 20" is used here to indicate that the method steps are performed within the RBS 20. However, the congestion may occur outside the RBS 20 and/or have its cause outside the RBS 20. Embodiments of the method comprises detecting a condition indicative of a congestion and, in response thereto, manipulating the content of an RLC PDU 50a-n in the PQ 40. The RLC PDU 50a-n subject to manipulation may be any of the RLC PDUs 50a-n in the PQ 40. However, as indicated above, the sooner the TCP entity residing in the UE 30a-b is able to notice the corrupted (or discarded) TCP data packet, the better the congestion control works. Thus, it is advantageous if the RLC PDU 50a-n subject to manipulation is an RLC PDU 50a-n close to the head of the queue. Preferably, the RLC PDU subject to manipulation is the RLC PDU 50a in the head of the PQ 40. However, the manipulation of other RLC PDUs 50a-n, such as the second RLC PDU 50b in the PQ 40, the third RLC PDU 50c in the PQ 40, or the fourth RLC PDU 50d in the PQ 40, would also work, but the closer to the head of the PQ 40 the RLC PDU 50a-n subject to manipulation is located, the faster the proposed method of congestion control will be able to react to congestions. According to some embodiments, the RLC PDU subject to manipulation is an RLC PDU in the first fourth, first third, or first half of the PQ 40. According to some embodiments, the RLC PDU subject to manipulation is an RLC PDU in the PQ 40 to be transmitted in the same TTI (Transmission Time Interval) as the RLC PDU 50a in the head of the PQ 40.

Figure 4:
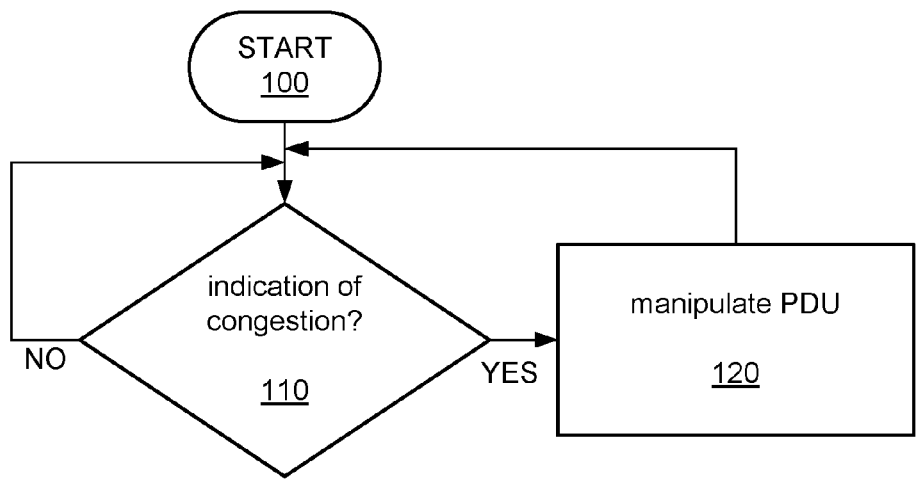
FIG. 4 is a flow chart of a method according to an embodiment of the present invention.

FIG. 4 shows a flowchart of a method according to an embodiment of the present invention. The operation is started in step 100. In step 110, it is checked whether a condition indicative of congestion has occurred. If not, the operation continues in step 110, again checking whether a condition indicative of congestion has occurred. Step 110, together with the NO branch in FIG. 4 can thus be seen as (or be replaced with) a step of "waiting for a condition indicative of congestion to occur". If it is determined, or detected, in step 110 that a condition indicative of congestion has indeed occurred, the operation proceeds to step 120. In step 120, the content of an RLC PDU 50a-n in the PQ 40 is manipulated in order to discard the corresponding TCP packet, thereby triggering entry into the above-mentioned congestion avoidance mode of the TCP protocol. The operation then returns to step 110 waiting for a new condition indicative of congestion to occur.

It should be noted that there may be several different ways to detect congestion, such as but not limited to:

1) Detecting that the targeted buffer length or dwell time in the PQ 40 of the RBS 20 is exceeded.
2) Detecting a loss of data in the TN (Transport Network). (The loss of data in TN may be detected by a missing or erroneous TN frame type 1 or 2.)
3) Detecting a processing or memory congestion.

According to some embodiments of the present invention, manipulating the content of said RLC PDU 50a-n comprises altering one or more bits of the RLC SDU 80 of the RLC PDU 50a-n. Performing the manipulation on the RLC SDU 80 allows for leaving the RLC header 70 intact (or "unchanged"). By manipulating the RLC SDU 80 but leaving the RLC header 70 intact, the manipulated RLC PDU 50a-n is considered valid on RLC protocol level, but corrupt on TCP level (e.g. detectable with a checksum in the TCP header). Thereby, the TCP packet can be discarded while at the same time avoiding RLC retransmissions (which would result if the RLC header had not been left intact), which is advantageous to reduce unnecessary data traffic.

The size of the RLC header 70 is not necessarily fixed, but may vary from RLC PDU to RLC PDU. In some embodiments, the RLC SDU 80 of the RLC PDU 50 may be manipulated by altering (i.e. changing from 1 to 0 or vice versa) the last bit of the RLC PDU 50 (which is known in some scenarios to belong to the RLC SDU 80 regardless of the size of the RLC header). In some embodiments, the manipulation of the RLC SDU 80 of the RLC PDU 50 is performed by only altering the last bit of the RLC PDU 50. This is a simple and efficient way of performing the manipulation of the RLC PDU 50 while avoiding changing the RLC header 70.

However, in other embodiments, in order to manipulate (or corrupt) the RLC SDU 80, any part of the RLC SDU 80 may be targeted. Changing one bit is one option. Other embodiments targeting more bits or other parts of the RLC SDU 80, or even substituting the whole RLC SDU 80, are also possible. The important thing is that the TCP error correction detects the manipulated RLC SDU (or SDUs) 80 as erroneous.

Since the contents of the MAC-d PDU on RLC protocol level is not known beforehand in the RBS 20, the identification of the RLC SDU part 80 of the MAC-d PDU may either be done implicitly (e.g. by assuming/knowing as above that at least the last bit of the PDU belongs to the RLC SDU 80) or by actually decoding the MAC-d PDU on RLC protocol level in the RBS 20. The implicit method to identify the RLC SDU part 80 is simpler to implement and not as processing intensive as decoding the MAC-d PDU 50 in the RBS 20. According to some embodiments, the RBS 20 targets (i.e. selects for manipulation) RLC PDUs with a size corresponding to the maximum MAC-d PDU size in case flexible RLC is configured. This is done in order to avoid corrupting RLC control data and status reports and TCP control and TCP ACK data. If flexible RLC is used and no concatenation is employed, then the contents of the RLC PDU may be deduced based on the size. In this case, the last part of such an RLC PDU with the maximum MAC-d PDU size will be part of segmented TCP data. If the RLC PDUs are smaller, the contents may either be TCP data or RLC control data. In case fixed size RLC AM (Acknowledge Mode) is configured, it is not possible to distinguish the RLC SDUs based on size and any TCP packet or RLC control PDU may be targeted. It should however be noted that since the RLC PDU is padded up to the configured RLC PDU size, manipulating the last bit to corrupt the PDU will corrupt the padding and not the RLC SDU 80. The padding bits are ignored and discarded and therefore the value of the padding bits is irrelevant. Therefore, in such cases, decoding the RLC PDU 50 in the RBS 20 to identify the RLC SDU part 80 may be necessary. Alternatively, in order to reduce the risk of manipulation padding bits instead of the RLC SDU part 80, more than one RLC PDUs 50, 50a-n in the PQ 40 may be manipulated upon detection of a condition indicative of congestion.

According to some embodiments, the control unit 60 of the RBS 20 continues to monitor the buffer buildup and initiates another RLC PDU manipulation for discarding a TCP packet if the buffer continues to buildup. This facilitates protection against major buffer overruns and also against the (however unlikely) scenario that the identification of the RLC SDU 80 fails and that the RLC header 70 is corrupted instead, which in turn will lead to an RLC retransmission instead of a TCP packet drop.

Some embodiments of the present invention facilitates coexistence of WCDMA RAN (Radio Access Network) systems with Long Term Evolution (LTE) RAN systems using a similar TCP-based flow control. LTE systems normally uses TCP protocol behavior for congestion control. In the event that WCDMA system, to coexist with the LTE system, also uses TCP protocol for congestion control, e.g. utilizing embodiments of the present invention, both technologies (LTE and WCDMA) may utilize the same TN queue (IP link) without one of the technologies "starving" the other.

As indicated in the beginning of this detailed description, embodiments of the present invention are applicable in other types of communication systems as well. Thus, more generally, in accordance with embodiments of the present invention, there is provided a method for congestion control in a network node (such as the RBS 20) of a communication network (such as the above described WCDMA HS-DSCH network) utilizing a distributed queue system for transmission of data units, wherein said network node has a PQ (such as the PQ 40) for PDUs (such as the RLC PDUs 50, 50a-n) in accordance with a persistent retransmission protocol. Said method comprises detecting a condition indicative of a congestion and, in response thereto, manipulating the content of a PDU in the PQ. Alternative formulations for "PDUs in accordance with a persistent retransmission protocol" used in this specification are e.g. "PDUs within a persistent retransmission protocol" and "PDUs utilizing a persistent retransmission protocol". Advantageously, as discussed above in the context of the WCDMA HS-DSCH network, the PDU subject to manipulation may be a PDU in the head of the PQ. Alternatively, the PDU subject to manipulation may be a PDU in the PQ to be transmitted in the same transmission time interval (TTI) as the PDU in the head of the PQ. Furthermore, as is also discussed above in the context of the WCDMA HS-DSCH network, manipulating the content of the PDU may comprise altering one or more bits of an SDU payload of the PDU. For example, as is also discussed above in the context of the WCDMA HS-DSCH network, altering one or more bits of the SDU payload of the PDU may comprise altering the last bit (possibly only the last bit) of the PDU. As is also discussed above in the context of the WCDMA HS-DSCH network, it may be advantageous to leave a header (such as the RLC header 70) of the persistent retransmission protocol included in the PDU intact when manipulating the PDU in order to avoid unnecessary retransmissions. Examples of conditions indicative of congestion, also in this more generalized context, may be that a targeted buffer length or dwell time in the PQ is exceeded and/or a loss of data in a TN between a network controller (such as the RNC 10) and the network node (such as the RBS 20).

Correspondingly, according to some embodiments of the present invention, there is provided a network node (such as the RBS 20) for operation in a communication network (such as the above mentioned WCDMA HS-DSCH network) utilizing a distributed queue system for transmission of data units. Said network node has a PQ (such as the PQ 40) for PDUs (such as the RLC PDUs 50, 50a-n) in accordance with a persistent retransmission protocol. The network node further comprises a control unit (such as the control unit 60) configured to detect a condition indicative of a congestion and, in response thereto, manipulate the content of a PDU in the PQ. In conformity with embodiments of the method described above, the PDU subject to manipulation may be a PDU in the head of the PQ. Alternatively, the PDU subject to manipulation may be a PDU in the PQ to be transmitted in the same transmission time interval (TTI) as the PDU in the head of the PQ. Furthermore, also in conformity with embodiments of the method described above, the control unit may be adapted to manipulate the content of the PDU by altering one or more bits of an SDU payload of the PDU, which may include the last bit of the PDU (possibly only the last bit of the PDU). Moreover, also in conformity with embodiments of the method described above, the control unit may be adapted to leave a header (such as the RLC header 70) of the persistent retransmission protocol included in the PDU intact when manipulating the content of the PDU. Also in conformity with embodiments of the method described above, examples of conditions indicative of congestion that the control unit may be adapted to detect may be that a targeted buffer length or dwell time in the PQ is exceeded and/or a loss of data in a TN between a network controller (such as the RNC 10) and the network node (such as the RBS 20).

In embodiments described above, TCP flows and TCP congestion control mechanisms are considered. However, similar to TCP, UDP (User Datagram Protocol) also has a checksum in the header. This checksum is optional, but higher layer protocols may have checksums instead. The UDP checksum (if used) or checksum of a higher layer protocol, may also be utilized to detect a manipulated/discarded PDU. Hence, embodiments of the present invention may also be utilized for congestion control of UDP flows in a similar way as for TCP flows.

Figure 5:
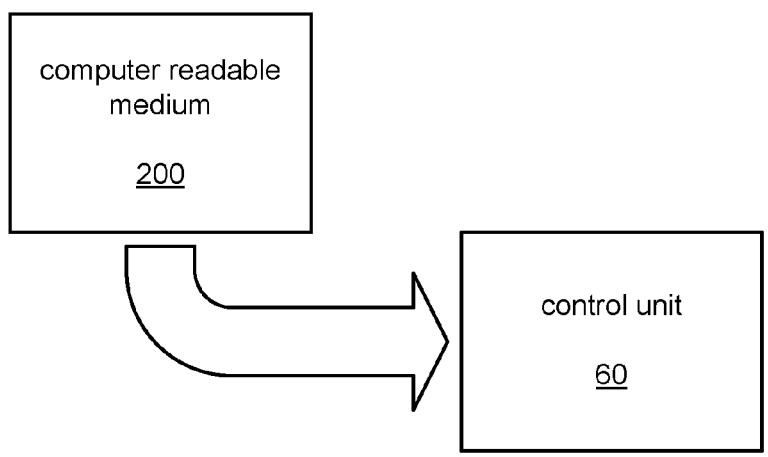
FIG. 5 schematically illustrates a computer-readable medium and a programmable control unit.

The above-mentioned control unit (such as the control unit 60 in FIG. 2) may be implemented as an application-specific hardware unit. Alternatively, said control unit or parts thereof may be implemented using one or more configurable or programmable hardware units, such as but not limited to one or more field-programmable gate arrays (FPGAs), processors, or microcontrollers. Thus, the control unit may be a programmable control unit. Hence, embodiments of the present invention may be embedded in a computer program product, which enables implementation of the method and functions described herein, e.g. the embodiments of the method described with reference to FIG. 4. Therefore, according to embodiments of the present invention, there is provided a computer program product, comprising instructions arranged to cause the programmable control unit 60 to perform the steps of any of the embodiments of the method described herein. The computer program product may comprise program code which is stored on a computer readable medium 200, as illustrated in FIG. 5, which can be loaded and executed by the programmable control unit 60, to cause it to perform the steps of any of the embodiments of the method described herein.

Figure 6:
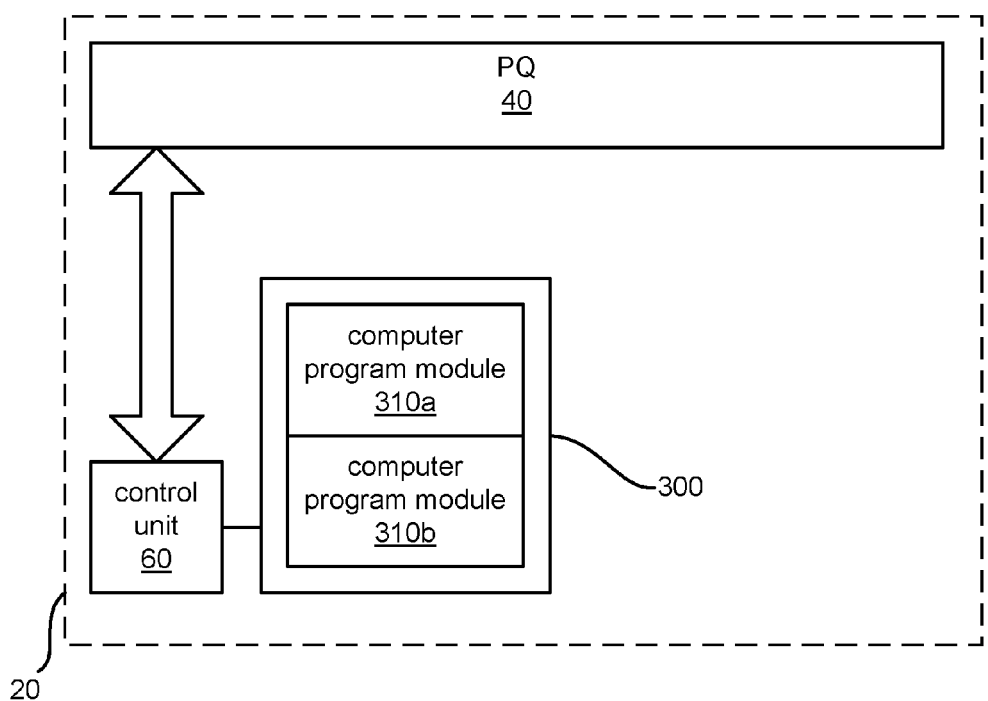
FIG. 6 schematically illustrates a computer program product to be run on a programmable control unit of a network node according to an embodiment of the present invention.

The above-mentioned computer program product may thus be a computer program product for congestion control in a network node of a communication network utilizing a distributed queue system for transmission of data units, wherein said network node has a PQ for PDUs in accordance with a persistent retransmission protocol. In accordance with some embodiments, the computer program product comprises a computer program module for detecting a condition indicative of a congestion and a computer program module for, in response detecting the condition indicative of congestion, manipulating the content of a PDU in the PQ. This is illustrated with an embodiment in FIG. 6, showing a computer program product 300. The computer program product 300 comprises a computer program module 310a for detecting a condition indicative of a congestion when the computer program module 310a is run on the programmable control unit 60. Furthermore, the computer program product 300 comprises a computer program module 310b for, in response detecting the condition indicative of congestion, manipulating the content of a PDU (50a-n) in the PQ (40) when the computer program module 310b is run on the programmable control unit 60. The computer program product 300 may comprise further computer program modules for performing any of the steps of embodiments of the method described herein when the corresponding computer program module is run on the programmable control unit 60. For example, the computer program module 310b may be or comprise a computer program module for altering one or more bits of the SDU payload of the PDU to be manipulated, such as the last bit (possibly only the last bit) of the PDU to be manipulated.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method for congestion control in a network node of a communication network utilizing a distributed queue system for transmission of data units, wherein said network node has a priority queue (PQ) for protocol data units (PDUs) in accordance with a retransmission protocol, the method comprising:
   detecting a condition indicative of a congestion; and,
   in response thereto, manipulating a PDU in the PQ, wherein the retransmission protocol is a persistent retransmission protocol and wherein said manipulating the PDU comprises manipulating the content of the PDU, said manipulating the content of the PDU comprising altering one or more bits of a service data unit (SDU) payload of the PDU while leaving a header of the persistent retransmission protocol included in the PDU intact.

2. The method of claim 1, wherein the PDU subject to manipulation is a PDU in the head of the PQ.

3. The method of claim 1, wherein the PDU subject to manipulation is a PDU in the PQ to be transmitted in the same transmission time interval (TTI) as the PDU in the head of the PQ.

4. The method of claim 1, wherein altering one or more bits of the SDU payload of the PDU comprises altering the last bit of the PDU.

5. The method of claim 4, wherein altering one or more bits of the SDU payload of the PDU comprises altering only the last bit of the PDU.

6. The method of claim 1, wherein the condition indicative of congestion is that a targeted buffer length or dwell time in the PQ is exceeded.

7. The method of claim 1, wherein the condition indicative of congestion is a loss of data in a transport network (TN) between a network controller and the network node.

8. The method of claim 7, wherein the communication network is a radio communication network, the network node is a radio base station (RBS), said PDUs in accordance with a persistent retransmission protocol are Radio Link Control (RLC) PDUs, and said network controller is a radio network controller (RNC).

9. The method of claim 1, wherein the communication network is a radio communication network, the network node is a radio base station (RBS) and said PDUs in accordance with a persistent retransmission protocol are radio link control (RLC) PDUs.

10. The method of claim 9, wherein the radio communication network is a wideband code-division multiple access (WCDMA) high-speed downlink shared channel (HS-DSCH) radio network.

11. A non-transitory computer-readable medium having stored thereupon a computer program product comprising computer program code instructions for execution by a programmable control unit of the network node, the program code instructions comprising instructions for causing the network node to:
   detect a condition indicative of a congestion; and,
   in response thereto, manipulate a PDU in the PQ, wherein the retransmission protocol is a persistent retransmission protocol and wherein said manipulating of the PDU comprises manipulating the content of the PDU, said manipulating the content of the PDU comprising altering one or more bits of a service data unit (SDU) payload of the PDU while leaving a header of the persistent retransmission protocol included in the PDU intact.

12. A network node for operation in a communication network utilizing a distributed queue system for transmission of data units, wherein said network node has a priority queue (PQ) for protocol data units (PDUs) in accordance with a retransmission protocol, and further comprises a control unit configured to:
   detect a condition indicative of a congestion; and
   in response thereto, manipulate a PDU in the PQ, wherein the retransmission protocol is a persistent retransmission protocol and wherein said manipulating of the PDU comprises manipulating the content of the PDU, said manipulating the content of the PDU comprising altering one or more bits of a service data unit (SDU) payload of the PDU while leaving a header of the persistent retransmission protocol included in the PDU intact.

13. The network node of claim 12, wherein the PDU subject to manipulation is a PDU in the head of the PQ.

14. The network node of claim 12, wherein the PDU subject to manipulation is a PDU in the PQ to be transmitted in the same transmission time interval (TTI) as the PDU in the head of the PQ.

15. The network node of claim 12, wherein the control unit is adapted to manipulate the content of the PDU by altering the last bit of the PDU.

16. The network node of claim 15, wherein the control unit is adapted to manipulate the content of the PDU by altering only the last bit of the PDU.

17. The network node of claim 12, wherein one condition indicative of congestion that the control unit is adapted to detect is that a targeted buffer length or dwell time in the PQ is exceeded.

18. The network node of claim 12, wherein one condition indicative of congestion that the control unit is adapted to detect is a loss of data in a transport network (TN) between a network controller and the network node.

19. The network node of claim 18, wherein the communication network is a radio communication network, the network node is a radio base station (RBS), said PDUs in accordance with a persistent retransmission protocol are Radio Link Control (RLC) PDUs, and said network controller is a radio network controller (RNC).

20. The network node of claim 12, wherein the communication network is a radio communication network, the network node is a radio base station (RBS) and said PDUs in accordance with a persistent retransmission protocol are radio link control (RLC) PDUs.

21. The network node of claim 20, wherein the radio communication network is a wideband code-division multiple access (WCDMA) high-speed downlink shared channel (HS-DSCH) radio network.

* * * * *